US006765473B1

(12) United States Patent
Pavatich et al.

(10) Patent No.: US 6,765,473 B1
(45) Date of Patent: Jul. 20, 2004

(54) ACCESS SYSTEM FOR VEHICLES

(75) Inventors: Gianfranco Pavatich, Keilor Downs (AU); Peter Crowhurst, Rowville (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,288

(22) PCT Filed: Jul. 16, 1999

(86) PCT No.: PCT/DE99/02178

§ 371 (c)(1), (2), (4) Date: Mar. 26, 2001

(87) PCT Pub. No.: WO00/05696

PCT Pub. Date: Feb. 3, 2002

(30) Foreign Application Priority Data

Jul. 20, 1998 (AU) .......................................... PP 4752
Jun. 8, 1999 (AU) .......................................... 33933/99

(51) Int. Cl.[7] .......................................... H04Q 1/00
(52) U.S. Cl. .......................................... 340/5.64; 340/825.72
(58) Field of Search .......................................... 340/572, 5.61, 340/5.6, 5.63, 825.72

(56) References Cited

U.S. PATENT DOCUMENTS 3,168,737 A * 2/1965 Weinstein .................. 340/5.62
4,106,006 A * 8/1978 Atkins .................. 340/5.61
4,209,783 A 6/1980 Ohyama et al.
4,263,595 A 4/1981 Vogel
4,471,343 A * 9/1984 Lemelson .................. 340/5.31
4,595,902 A * 6/1986 Proske et al. .................. 340/5.72
4,761,644 A * 8/1988 Kawai et al. .................. 340/5.64
5,477,214 A * 12/1995 Bartel .................. 340/5.64
5,680,134 A * 10/1997 Tsui .................. 340/5.64
5,933,086 A * 8/1999 Tischendorf et al. ...... 340/5.64

FOREIGN PATENT DOCUMENTS

GB 2 259 227 3/1993
WO WO 96 07168 3/1996

* cited by examiner

*Primary Examiner*—Brian Zimmerman
(74) *Attorney, Agent, or Firm*—Kenyon & Kenyon

(57) ABSTRACT

An access system (2) including an electronic key (4) provided with a transmitter (6) and including a secured location provided with a receiver (10), the transmitter (6) and the receiver (10) being designed to communicate with one another to exchange authentication data. The transmitter (6) transmits a signal; the receiver (10) converts the transmitted signal into spectral data; and, in response to transmission of the authentication data, the access system (2) grants access to the secured location, provided the spectral data matches the spectral signature of transmitter (6).

23 Claims, 3 Drawing Sheets

ACCESS SYSTEM FOR VEHICLES

FIELD OF THE INVENTION

The present invention relates to an access system, in particular a passive access system for vehicles.

BACKGROUND INFORMATION

Passive vehicle access system in existence today make use of remote-controlled electronic keys. The keys are equipped with a transmitter, which transmits authentication data to a receiver located in the vehicle when the key is within a predefined range of the receiver. The communication protocol activated between the transmitter and receiver uses a radio frequency (RF) interface to route the transmitted data. The radio frequency (RF) interface has a limited range to ensure that the communications connection is discontinued when the individual possessing the key moves away from the vehicle's immediate vicinity.

Passive access systems are susceptible to tampering by unauthorized individuals, who use a repeater between the vehicle and the key. The repeater uses radio frequency amplifiers to produce the communications connection when the key is not in the vehicle's immediate vicinity. The present invention proposes a system that will eliminate this problem or at least offer a practical alternative thereto.

SUMMARY OF THE INVENTION

The present invention introduces an access system, which includes an electronic key that is provided with a transmitter and a secured location for the receiver, the transmitter and receiver being designed to communicate with one another to exchange authentication data. The transmitter transmits a signal; the receiver converts the transmitted signal into spectral data; and, in response to the transmission of the authentication data, the access system grants access to the secured location, provided the spectral data matches the transmitter's spectral signature.

Advantageously, the transmitter can detect the presence of a repeater when the spectral data represents the use of a transmission characteristic of the repeater.

The present invention also employs a method for granting access to a secured location, including:

- receiving a transmitted signal;
- converting the transmitted signal into spectral data;
- comparing the spectral data to a spectral signature of a transmitter; and
- granting access to the secured location in response to receipt of authentication data, provided the spectral data matches the spectral signature.

DETAILED DESCRIPTION

Figure 1:
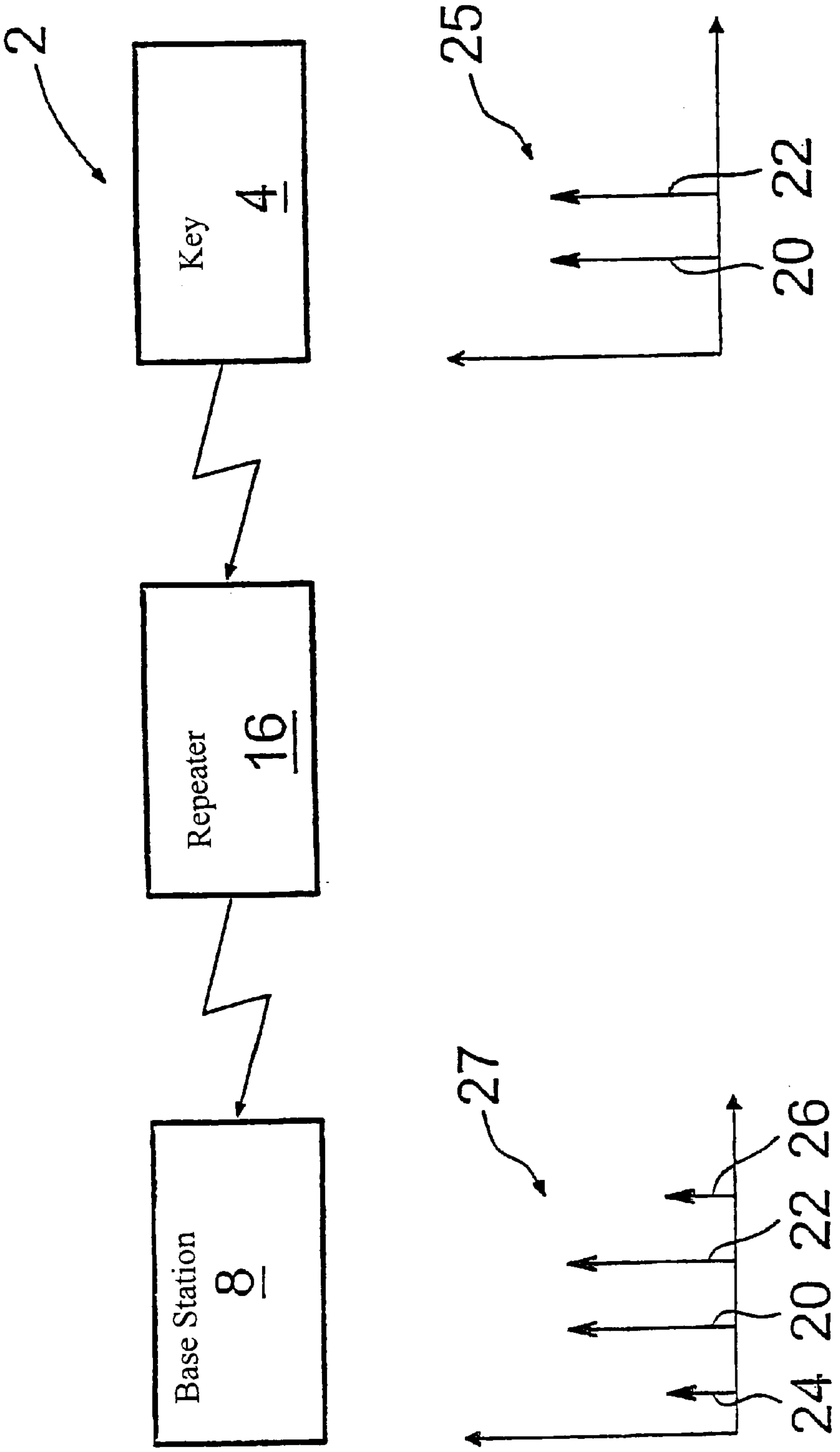
FIG. 1 shows a schematic view of an embodiment of an access system and transmitted and received signals according to an embodiment of the present invention.

A passive access system 2, as shown in the figures, includes the following: an electronic key 4 having a transmitter 6 and an induction coil antenna 7, a radio base station 8 having a receiver 10 and an induction coil antenna 12. Radio base station 8 is kept at a secured location, such as in a vehicle, and controls access to the secured location. When the key is brought within a certain range of antenna 12 of receiver 10, receiver 10 activates key 4, thereby causing transmitter 6 to initialize transmission to receiver 10. Data is transmitted using radio frequency signals, which establish a communications connection between key 4 and radio base station 8. The data transmitted between key 4 and radio base station 8 is determined by a communication protocol, with which key 4 and radio base station 8 comply, and which includes the transmission of authentication data from key 4 to receiver 10. Radio base station 8 only grants access to the secured location when the transmitted authentication data matches the authentications stored in radio base station 8.

To establish a communications connection between key 4 and radio base station 8 when key 4 is at a location outside of the predefined range of antenna 12 of the receiver, a radio frequency repeater 16 can be brought between key 4 and radio base station 8. To establish the communications connection, the repeater uses amplifiers, which must significantly amplify the signals transmitted by system 2, to span the distance between key 4 and radio base station 8. The amplifiers of any repeater 16 having a high degree of amplification have a transmission characteristic, which is ideally linear, in practical use, however, it is never linear and reaches a maximum degree of amplification. Therefore, repeater 16 interferes with the signal transmitted by key 4, and the linearity of repeater 16 determines the magnitude of the signal interference effect. A measurement, known as the two-tone measurement, can be used to measure the linearity of the repeater to determine the third order intercept point of the repeater. The third order intercept point is a theoretical point where third order tones, which are produced by mixing the transmitted fundamental tones, intercept and interfere with the fundamental tones in the sense that the third order signals emitted by the repeater have the same amplitude as the fundamental signals and/or first order signals. The third order intercept point (IP3) of a radio frequency repeater is a characteristic property, which can be determined by measuring the received signal strength of the third order intermodulation tones received by the receiver.

Passive access systems usually transmit data using one single radio frequency tone. To detect the presence of a repeater 16 due to the signal interference, which the repeater causes, access system 2 of the preferred exemplary embodiment transmits two fundamental frequency tones 20 and 22, as shown in transmission spectrum 25. The two radio frequency tones 20 and 22 can be used for transmitting data; however, the accuracy of the subsequent two-tone measurement taken by receiver 10, as described in the following, may only be 5%. The accuracy of the measurement is ±1% when key 4 transmits tones 20 and 22 with a constant amplitude for the two-tone measurement and then subsequently transmits the authentication data using radio frequency modulation with one or both tones, which represent the carrier signal.

Figure 2:
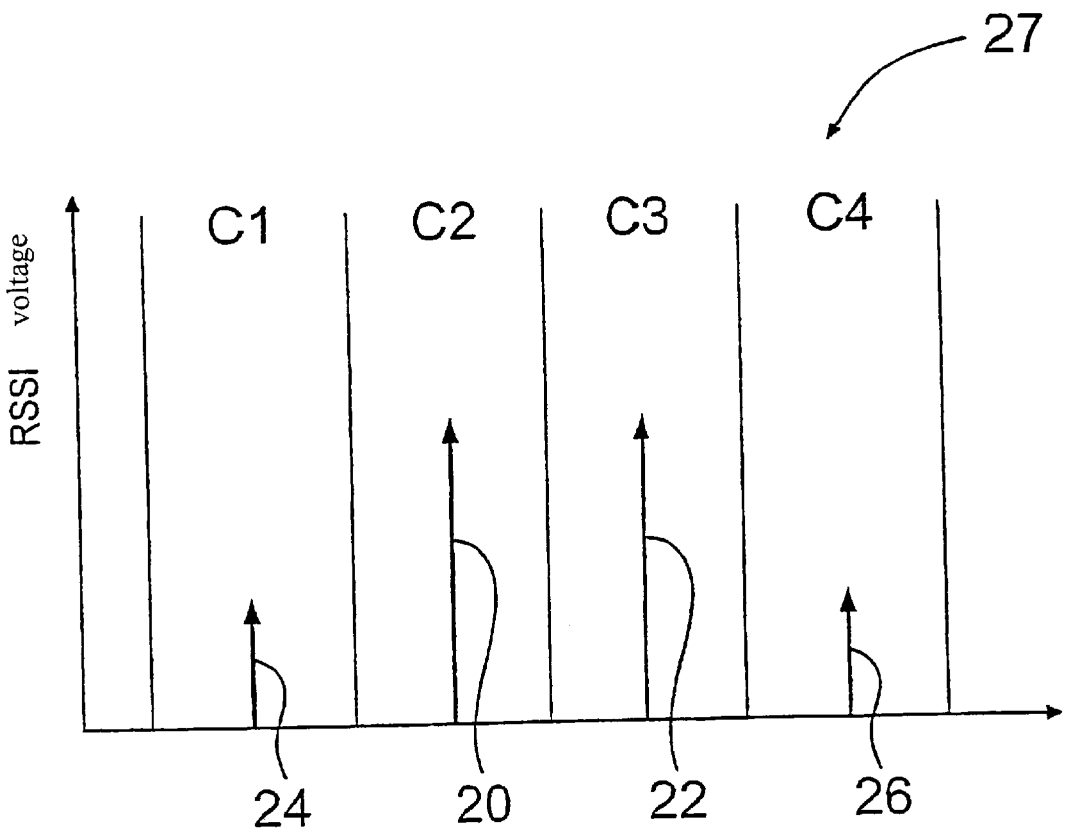
FIG. 2 shows a schematic diagram of the received signal strength in relation to the frequency.

In response to the transmission of fundamental tones 20 and 22, the receiver receives the tones and two third order intermodulation tones 24 and 26, as shown in the frequency response or spectral response 27 for receiver 10. Fundamental tones 20 and 22, as shown in FIG. 2, are stored in adjacent frequency channels C2 and C3, while intermodulation tones 24 and 26, which are produced by mixing the fundamental tones, have a reduced amplitude and are located in a low frequency channel C1 and a higher frequency channel C4. A received signal strength indicator (RSSI) is produced by most FM receiving terminal semiconductors and can provide a measurement of the amount of energy received in each channel C1 through C4. The RSSI output produced by receiver 10 is a voltage, which is proportional to the in-band energy of the signal received in each measured channel C1 through C4. The RSSI for each channel can therefore be used to determine any variation, which is introduced into the third order modulation tones 24 and 26 by introducing a repeater 16, as a result of the non-linearity of the amplifiers of repeater 16. To detect this variation, access system 2 is activated, a normal communications connection first being established within the predefined range between key 4 and radio base station 8; the RSSI for each channel C1 or C4 being measured; and this measurement being recorded as a spectral signature for transmitter 6 of key 4. All future transmissions can be measured in a similar manner to determine if any repeater was introduced into the system to alter the amount of received third order intermodulation energy. Furthermore, the difference received in the third order tones can be used to determine a characteristic third order intercept point to identify tampering repeater 16. The detection of a repeater 16 by radio base station 10 ensures that radio base station 10 denies access to the secured location, even if the authentication data is received as valid.

Figure 3:
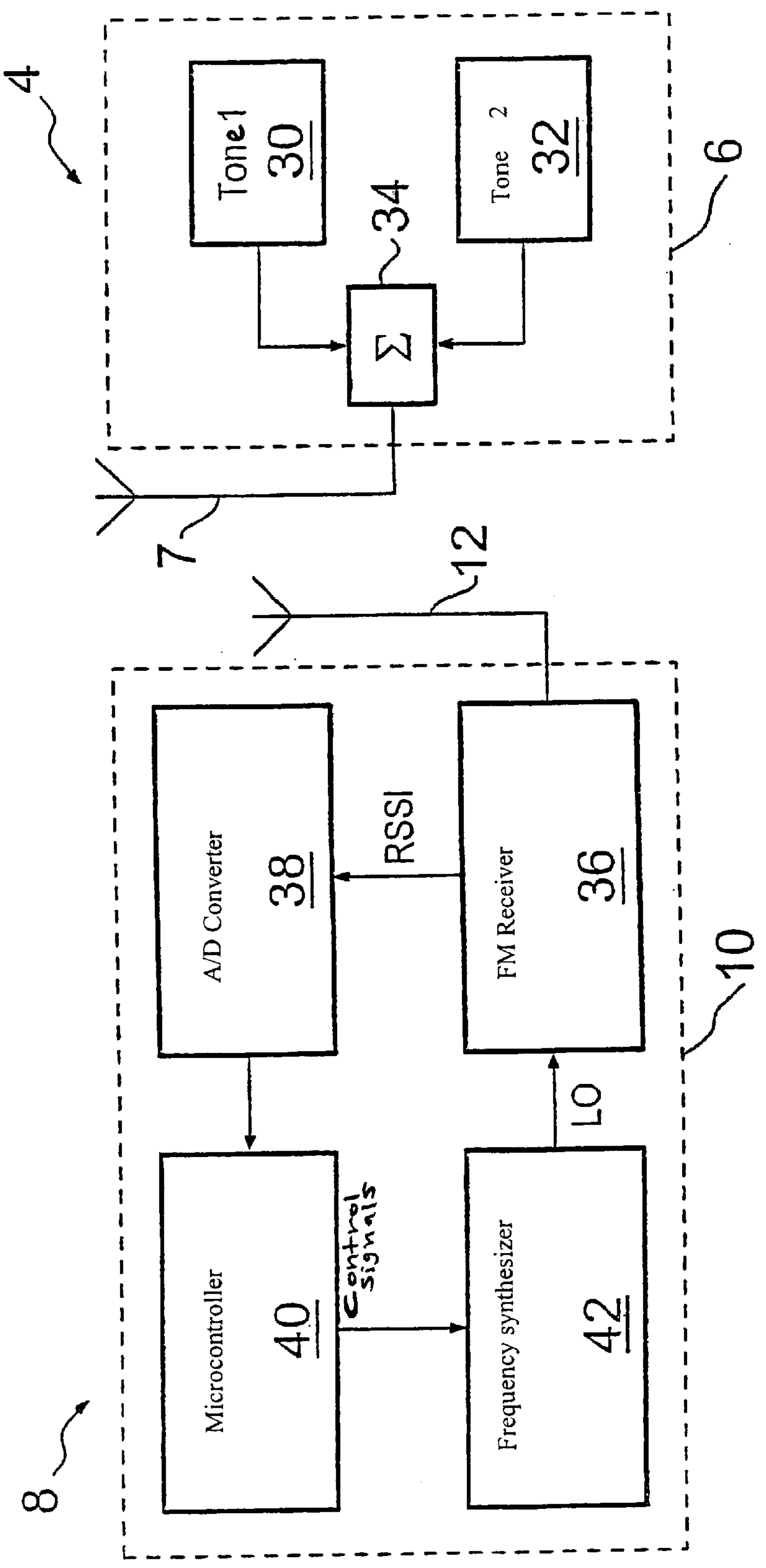
FIG. 3 is a block diagram of the access system according to an embodiment of the present invention.

Transmitter 6, as shown in FIG. 3, includes a switching logic, which transmits two constant sound signals once receiver 10 activates key 4. The switching logic can include for the tones, two radio frequency oscillators 30 and 32, respectively, whose outputs are combined in a multiplexer 34 for transmission to antenna 7 of transmitter 6. Alternatively, the switching logic can include a complex quadrature modulator, which enables the production of two tones separated by more than the channel distance used in receiver 10.

Receiver 10 includes FM receiving terminal 36, which is connected to antenna 12, an analog-digital converter 38, a microcontroller 40, and a frequency-synthesized local oscillator 42. Microcontroller 40 is programmed for controlling frequency synthesizer 42 and for processing data received by analog-digital converter 38. The frequency synthesizer is used for selecting the frequency channels, which are to be processed by FM receiver 36, which, as discussed above, produces an RSSI output for each of the four channels C1 through C4. The RSSI output for each channel is routed to the analog-digital converter for conversion into a binary word for processing by microcontroller 40.

Microcontroller 40 treats the binary word as spectral data, which represents the received energy in each channel C1 through C4, and then compares the spectral data to a previously stored spectral signature for transmitter 6.

System 2 is actuated in that key 4 is brought within the predefined range of antenna 12, thereby activating key 4 and causing the transmission of two fundamental tones. The spectral data received by microcontroller 40 is then stored as a spectral signature of transmitter 6 for future comparison for all subsequent communication between key 4 and receiver 10.

Accordingly, key 4 and radio base station 8 then perform the following steps when a communications connection is established:

(i) Before transmitting any authentication data, the two fundamental tones in channels C2 and C3 are simultaneously transmitted.

(ii) Frequency synthesizer 42 selects the four channels C1 through C4, and FM receiver 36 produces an RSSI output for each channel.

(iii) Microcontroller 40 receives and processes the spectral data, which is representative of the received signal level for each channel, and the spectral data is compared to the stored spectral signature.

(iv) In the event that there is a deviation of more than ±1% between the spectral signature and the spectral data, microcontroller 40 causes radio base station 10 to discontinue the authentication procedure and to prevent access to the secured location.

(v) The extent to which the received spectral data deviates from the spectral signature is recorded for subsequent analysis to determine a characteristic third order intercept point so that tampering repeater 16 can be identified. The number of tamperings from repeater 16 can also be stored.

(vi) When radio base station 10 then detects an authorized user and grants authorized access, microcontroller 40 causes a warning signal to be produced indicating that tampering was attempted.

The warning signal can be in the form of a word code, a warning light, or a sound signal, which is produced at the secured location, meaning the vehicle.

A number of modifications to this will become familiar to those skilled in the art without exceeding the scope of the present invention as it is herein described with reference to the attached drawings.

What is claimed is:

1. An access system, comprising:

an electronic key including a transmitter that transmits a signal; and a secured location including a receiver designed to communicate with the transmitter to exchange authentication data, the receiver converting the signal into spectral data;

wherein in response to transmission of the authentication data, access is granted to the secured location if the spectral data matches a spectral signature of the electronic key transmitter, and wherein the signal includes at least two tones, and the spectral data represent third order tones of the signal.

2. The access system of claim 1, wherein the transmitter activates the system and transmits the signal to the receiver, and the receiver converts the signal into spectral data and stores the spectral data as the spectral signature.

3. The access system of claim 1, wherein the signal includes a spread spectrum.

4. The access system of claim 1, wherein the tones have constant amplitude.

5. The access system of claim 4, wherein the spectral data is produced in at least two frequency bands on the basis of a received signal strength of the signal.

6. The access system of claim 5, wherein the at least two frequency bands correspond to each of the frequencies of the third order tones.

7. The access system of claim 6, wherein the receiver determines a difference between the spectral data and the spectral signature for use in identifying an unauthorized system.

8. The access system of claim 6, wherein the transmitter transmits authentication data after transmission of the constant amplitude tones.

9. The access system of claim 6, wherein the receiver includes:

demodulation elements for demodulating the signal for selected frequency bands and producing second signals of received signal strength for the selected bands; and conversion elements for converting the second signals into spectral data and for comparing the spectral data to the spectral signature.

10. The access system of claim 9, wherein the demodulation elements include a frequency synthesizer for selecting the frequency bands, and the conversion elements include a microcontroller for controlling the frequency synthesizer.

11. The access system of claim 1, wherein the secured location is within a vehicle.

12. A vehicle, comprising:

an access system including:

an electronic key including a transmitter that transmits a signal; and a secured location including a receiver designed to communicate with the transmitter to exchange authentication data, the receiver converting the signal into spectral data;

wherein in response to transmission of the authentication data, the access system grants access to the secured location if the spectral data matches a spectral signature of the electronic key transmitter, and wherein the signal includes at least two tones, and the spectral data represent third order tones of the signal.

13. A method for granting access to a secured location, comprising:

receiving a transmitted signal;

converting the transmitted signal into spectral data;

comparing the spectral data to a spectral signature of a transmitter;

granting access to the secured location in response to receipt of authentication data, provided the spectral data matches the spectral signature; and transmitting at least two tones in a transmitted signal, wherein the spectral data represents third order tones of the transmitted signal.

14. The method of claim 13, wherein the tones have constant amplitude.

15. The method of claim 14, wherein the spectral data is produced in at least two frequency bands on the basis of a received signal strength of the signal.

16. The method of claim 15, wherein the at least two frequency bands correspond to each of the frequencies of the third order tones.

17. The method of claim 16, wherein a receiver used in the receiving also determines a difference between the spectral data and the spectral signature for use in identifying an unauthorized system.

18. The method of claim 16, wherein a transmitter used in the transmitting transmits authentication data after transmission of the constant amplitude tones.

19. The method of claim 16, wherein a receiver used in the receiving includes:

demodulation elements for demodulating the signal for selected frequency bands and producing second signals of received signal strength for the selected bands; and conversion elements for converting the second signals into spectral data and for comparing the spectral data to the spectral signature.

20. The method of claim 19, wherein the demodulation elements include a frequency synthesizer for selecting the frequency bands, and the conversion elements include a microcontroller for controlling the frequency synthesizer.

21. The method of claim 13, wherein the secured location is within a vehicle.

22. The method of claim 13, wherein a transmitter used in the transmitting activates the system and transmits the signal to the receiver, and a receiver used in the receiving converts the signal into spectral data and stores the spectral data as the spectral signature.

23. The method of claim 13, wherein the signal includes a spread spectrum.

* * * * *

UNITED STATES PATENT AND TRADEMARK OFFICE

CERTIFICATE OF CORRECTION

PATENT NO. : 6,765,473 B1
DATED : July 20, 2004
INVENTOR(S) : Gianfranco Pavatich et al.

It is certified that error appears in the above-identified patent and that said Letters Patent is hereby corrected as shown below:

Title page,
Item [57], ABSTRACT,
Line 1, delete "(2) (4)"; change "including an electronic key" to -- includes an eletronic key --.
Line 2, delete "(6)"; change "including a second location" to -- includes a second location --.
Lines 3-5, delete "(10) (6) (10) (6)".
Line 6, change "transmits a signal;" to -- transmits a signal, and --; delete "(10)".
Line 7, change "spectral data; and, in response" to -- spectral data. In response --.
Lines 8 and 10, delete "(2) (6)".

Signed and Sealed this

Thirtieth Day of August, 2005

JON W. DUDAS
*Director of the United States Patent and Trademark Office*